(12) United States Patent
Lyons

(10) Patent No.: US 6,497,543 B1
(45) Date of Patent: Dec. 24, 2002

(54) AERODYNAMIC RESISTANCE WELD PIN

(75) Inventor: John Lyons, Levittown, NY (US)

(73) Assignee: Duro Dyne Corporation, Bay Shore, NY (US)

(*) Notice: Subject to any disclaimer, the term of this patent is extended or adjusted under 35 U.S.C. 154(b) by 0 days.

(21) Appl. No.: 09/989,766

(22) Filed: Nov. 20, 2001

(51) Int. Cl.[7] .......................... F16B 37/06; B23K 9/20
(52) U.S. Cl. ...................... 411/171; 411/480; 411/531; 411/545; 219/98
(58) Field of Search ................................ 411/440, 441, 411/171, 480, 482, 531, 545; 219/98, 99

(56) References Cited

U.S. PATENT DOCUMENTS

| | | | |
|---|---|---|---|
| 3,582,603 A | 6/1971 | Hinden | 219/99 |
| 3,588,787 A * | 6/1971 | Kindell et al. | 411/531 X |
| 3,591,762 A | 7/1971 | Hinden | 219/98 |
| 3,591,763 A | 7/1971 | Hinden | 219/99 |
| 3,624,340 A | 11/1971 | Hinden | 219/99 |
| 3,701,878 A | 10/1972 | Hinden et al. | 219/98 |
| 3,835,285 A | 9/1974 | Hinden et al. | 219/98 |
| 3,858,024 A | 12/1974 | Hinden et al. | 219/98 |
| 4,031,350 A | 6/1977 | Hinden | 219/99 |
| 4,429,209 A | 1/1984 | Hinden | 219/98 |
| 4,438,314 A | 3/1984 | Giannone | 219/98 |
| 4,482,795 A | 11/1984 | Hinden | 219/98 |
| 4,614,855 A | 9/1986 | Hinden | 219/98 |
| 4,855,561 A | 8/1989 | Hinden | 219/93 |
| 4,855,562 A | 8/1989 | Hinden | 219/93 |
| 5,139,379 A * | 8/1992 | Hasan et al. | 411/531 X |
| 5,709,059 A * | 1/1998 | Murphy et al. | 411/480 X |

FOREIGN PATENT DOCUMENTS

NL  7415863  *  6/1976  ................. 411/545

* cited by examiner

Primary Examiner—Neill Wilson
(74) Attorney, Agent, or Firm—Barry G. Magidoff; Paul J. Sutton

(57) ABSTRACT

A resistance weld pin for connecting batts of insulation to the interior of ducts is disclosed, the pin having superior aerodynamic properties which minimize turbulence in the duct flow stream and reduce the tendency of increments of the insulation surrounding the pin will become separated from the main body of the bott when introduced into the air stream. The pin assembly comprises a washer and a pin component projecting through the washer. The upper surface of the washer includes an annular depressed trough surrounding the head of the pin. Preferably the head is disposed within a central depression in the washer, the upper surface of the head forming a contact surface for the applying electrode and lying in a plane above an annular platform extending between the trough and the depression.

3 Claims, 2 Drawing Sheets

AERODYNAMIC RESISTANCE WELD PIN

BACKGROUND OF THE INVENTION

1. Field of the Invention

The present invention lies in the field of weld pins and more particularly to resistance weld pins used for attaching batts or sheets of insulated material to the interior surfaces of air ducts such as the ducts of air conditioning and heating systems.

2. The Prior Art

It is known to improve the energy efficiency of air conditioning and heating installations which employ metallic duct work, to apply to the ducts, and normally to the interior portions thereof, batts or sheets of insulating material. The insulation is typically one to two inches thick and comprised of a layer of fibrous material such as fiberglass.

The insulation is typically connected to the duct by an adhesive. In order to assure permanence of connection, a plurality of metallic members having a head portion bearing against the exposed surface of the insulation has a free end portion welded or otherwise attached to the metal duct.

A typical attachment mode employs a pin having an enlarged head and a sharpened tip. A washer is sleeved under the head to provide a large contact area with the insulation. The pin is applied by effecting a resistance weld between the sharpened tip and the interior of the duct, the pin having been forced through the insulation to provide contact between the tip and duct. A current is passed through the length of the pin while the pin is urged toward the duct resulting in the melting of the tip adjacent portions of the pin fusing the pin, to the duct.

Representative examples of pins for connecting insulation to ducts are found in the following U.S. Pat. Nos.: 4,855,561; 4,855,562; 3,582,603; 3,624,340; 3,835,285; 3,858,024; 4,438,314; 4,482,795; 4,614,855; 4,429,209; 4,031,350; 3,701,878; 3,624,340; 3,591,763; and 3,591,762. The above patents are owned by the Assignee of the instant application.

A difficulty inherent in the use of conventional weld pins as described above has been observed. Over time, the moving air stream within the duct has eroded the soft insulation material surrounding the pin heads. The erosion has caused increments of the insulation to become separated from the main mass and carried by the air stream through the ducting and injected into the treated environment. In addition, conventional pins have caused significant turbulence in the air stream resulting in reduced efficiency of air flow.

SUMMARY OF THE INVENTION

The present invention may be summarized as directed to a resistance weld pin having improved aerodynamic qualities. More particularly, it has been discovered that by modifying the configuration of the washer from the conventional simple planar disk in the manner set forth hereinbelow, erosion of the insulation material is minimized and the drag of frictional flow resistance is reduced.

In accordance with the invention there is provided a resistance weld pin having a shank, at one end of which is formed an enlarged head and at the other end a sharpened tip. A washer is sleeved over the tip along the shank into contact with the undersurface of the head of the weld pin. A characterizing feature of the invention resides in the configuration of the washer. More particularly, the washer includes a depression within which the head of the pin resides, the upper surface of the pin head lying in a plane above the depression. Surrounding the depression is a planar platform annulus, and surrounding the annulus is a well or trough extending between the platform and the outer margin of the washer.

The washer configuration described has provided a weld pin with substantially reduced tendency to create a turbulence adjacent the washer, which ultimately results in increments of the insulation being introduced into the air stream. In addition, the fluid flow within the duct has been improved. The significance of improved flow will be best appreciated when it is recognized that certain installations may include thousands of weld pins.

It is accordingly an object of the invention to provide a resistance weld pin for securing insulation to duct work which has aerodynamic characteristics superior to insulation pins heretofore known.

A further object of the invention is the provision of a resistance weld pin for supporting insulation to duct interiors, which is resistant to erosion of the pin adjacent components of insulation.

A still further object of the invention is the provision of a weld pin having a washer component which deflects air currents away from the insulation and into the central air stream.

DETAILED DESCRIPTION OF DRAWINGS

Figure 1:
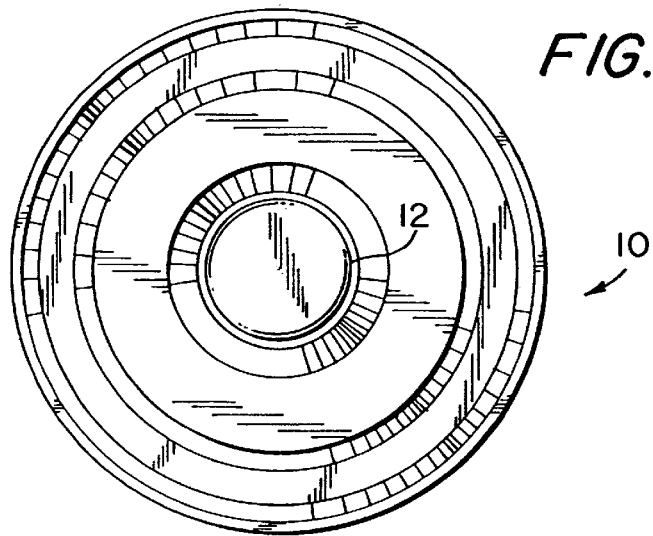
FIG. 1 is a top plan view of a weld pin in accordance with the invention.
Figure 2:
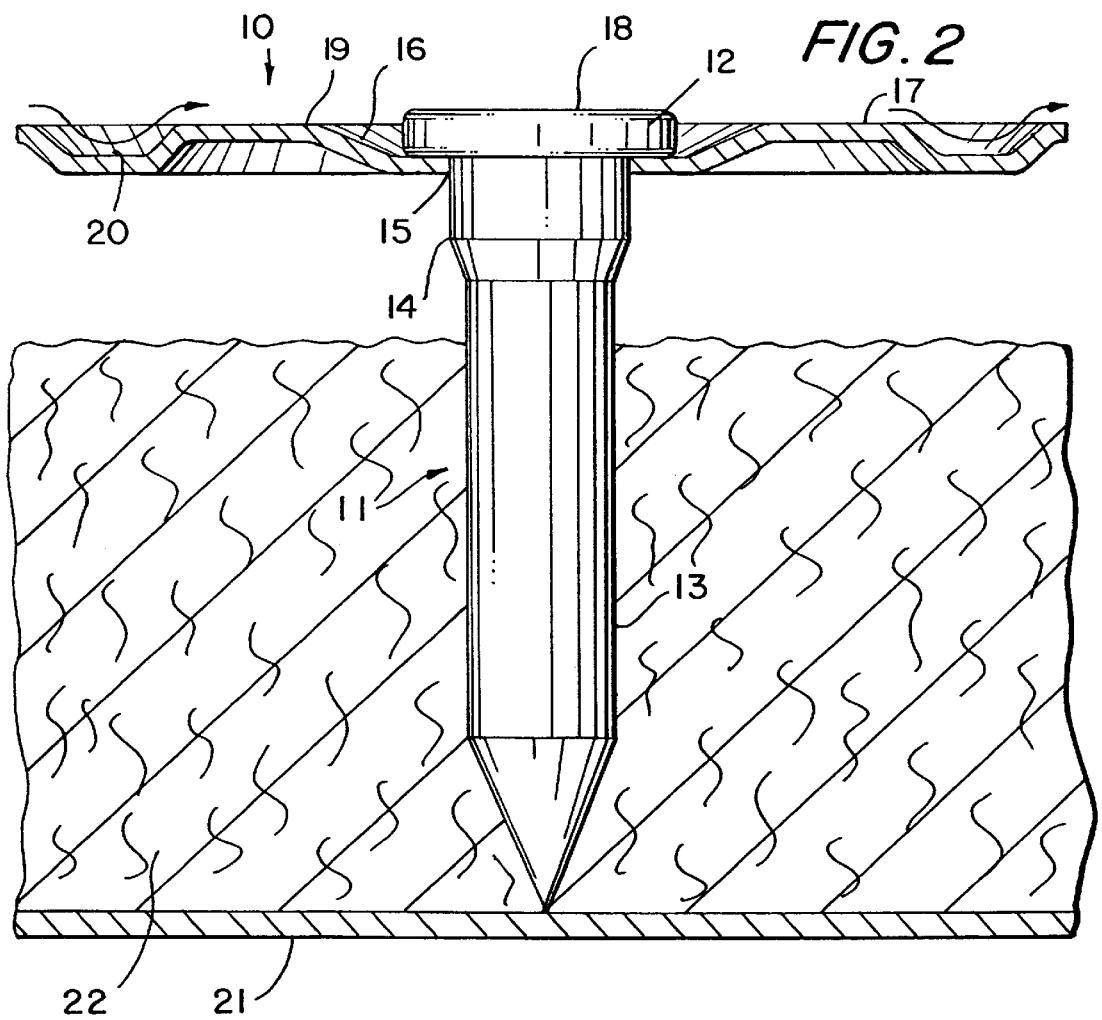
FIG. 2 is a side elevational view of a weld pin device in accordance with the invention, the pin component being shown in side elevation and the washer component in section.
Figure 3:
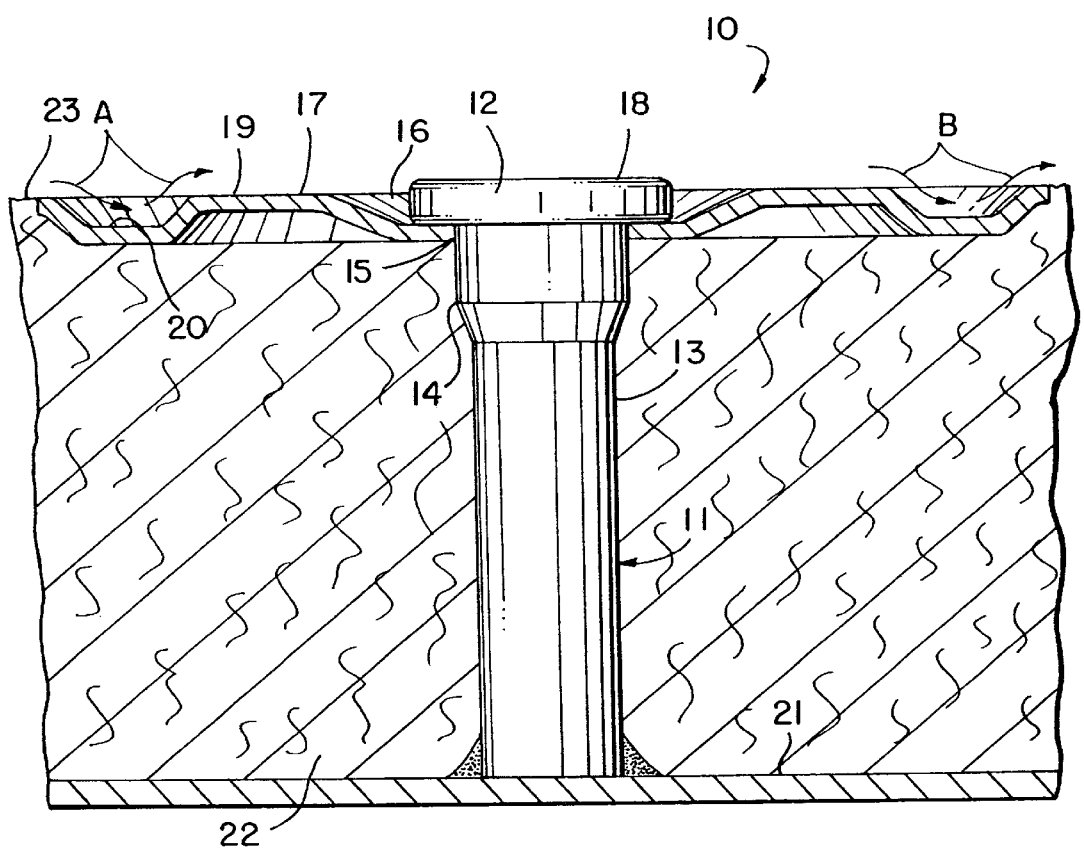
FIG. 3 is an enlarged view similar to FIG. 2 showing the position of the parts after attachment of the weld pin to a duct interior.

In FIG. 1 there is shown a top plan view of a weld pin in accordance with the invention. The weld pin assembly is comprised of a washer component 10 and a pin 11. The pin 11 includes a head portion 12 and an elongate shank 13. As best seen in FIG. 3, the shank includes an enlarged boss 14 beneath the head 12, the pin being connected to the washer 10 by a frictional interfit between boss 14 and aperture 15 formed in the washer.

A characterizing feature of the invention resides in the configuration of the upper surface of the circular washer 10. The washer includes a central annular depression 16 within which the head 12 of the pin component is located. Outwardly of the annular depression 16 and surrounding same is an annular platform 17. It is noted that the uppermost surface 18 of the head 12 of the pin is disposed in a plane above the uppermost surface 19 of the platform.

Outwardly of the platform 17 there is formed an annular trough 20.

Referring now to FIG. 3 wherein the pin is shown as weldingly attached to a duct component 21, it will be perceived that the pin has pierced the insulation batting material 22 and bonded to the interior of the duct component 21. The arrows A—A and B—B in FIG. 3 demonstrate the path of air flow passing adjacent the inner surface 23 of the insulation material 22. It has been determined that by deflecting the air stream in the manner illustrated by the arrows A—A and B—B of FIG. 3, that turbulent stream contact with the fibrous insulation 22 immediately surrounding the pin is minimized. In contrast to conventional flat-washered pin devices, as illustrated in the prior art cited, the amount of soft insulation carried into the air stream over a period of time is significantly reduced utilizing the device of the invention.

Without limitation and in compliance with the "best mode" requirements of the patent laws, a preferred weld pin assembly having a 1" washer head diameter incorporates a trough annulus which is 0.046" in depth and having a width of 0.075". The diameter of the platform component 17 is approximately 0.687" and the width of the annular depression is 0.409". It is understood that the dimensions are cited by way of example and not by way of limitation.

The weld pin of the present invention represents a significant improvement both in freedom of air flow and the diminishing of damage to the insulation material and consequent carrying of particulate material into the air stream.

As will be apparent from the preceding disclosure, numerous variations in details of construction will occur to those skilled in the art and familiarized with this disclosure. Accordingly, the invention is to be broadly construed within the scope of the appended claims.

What is claimed is:

1. In an aerodynamic resistance weld pin for connecting batts of insulation to the interior of ducts, comprising an axially-elongate shank having a head at one end and a sharp tip at the other end, said head including a planar, uppermost contact surface, an annular washer mounted on said shank, said head including an undersurface engaging said washer, the improvement which comprises a central annular depression on said washer surrounding said head and an upwardly open, annular trough surrounding said depression, the entirety of said trough lying in a plane below the plane of said contact surface.

2. An aerodynamic resistance weld pin in accordance with claim 1 wherein said washer includes an annular platform interposed between said trough and said depression, said platform lying in a plane below the plane of said contact surface.

3. A weld pin in accordance with claim 2 wherein the upper surface of said platform is planar.

* * * * *